(12) United States Patent
Thomas et al.

(10) Patent No.: US 6,435,319 B1
(45) Date of Patent: Aug. 20, 2002

(54) DISC BRAKE ACTUATOR

(75) Inventors: Paul Thomas; Ralph Pratt, both of Newport (GB)

(73) Assignee: Meritor Heavy Vehicle Braking Systems (UK) Limited (GB)

( * ) Notice: Subject to any disclaimer, the term of this patent is extended or adjusted under 35 U.S.C. 154(b) by 0 days.

(21) Appl. No.: 09/647,111

(22) PCT Filed: Mar. 23, 1999

(86) PCT No.: PCT/GB99/00911

§ 371 (c)(1),
(2), (4) Date: Nov. 20, 2000

(87) PCT Pub. No.: WO99/49232

PCT Pub. Date: Sep. 30, 1999

(30) Foreign Application Priority Data

Mar. 26, 1998 (GB) .............................................. 9806542

(51) Int. Cl.⁷ .............................................. F16D 55/08
(52) U.S. Cl. ..................... 188/72.1; 188/71.9; 188/72.7; 188/72.9; 188/196 D; 188/202
(58) Field of Search ............................... 188/72.1, 71.7, 188/71.8, 71.9, 72.6, 72.7, 72.8, 72.9, 79.51, 79.55, 196 M, 196 D, 196 V, 202

(56) References Cited

U.S. PATENT DOCUMENTS

| 3,489,251 | A |   | 1/1970  | Swift            |          |
|-----------|---|---|---------|------------------|----------|
| 4,819,768 | A | * | 4/1989  | Czich et al.     | 188/196 D|
| 5,582,273 | A | * | 12/1996 | Baumgartner et al.| 188/72.6|
| 5,664,646 | A |   | 9/1997  | Bejot et al.     |          |
| 5,833,035 | A | * | 11/1998 | Severinsson et al.| 188/72.1|

FOREIGN PATENT DOCUMENTS

| WO | 9701044 | 1/1997 |
| WO | 9701045 | 1/1997 |

* cited by examiner

*Primary Examiner*—Pam Rodriguez
(74) *Attorney, Agent, or Firm*—Carlson Gaskey & Olds

(57) ABSTRACT

An actuator (13) device for a disc brake (4) is provided comprising a rotary actuator (13) operable, via a force transmission device (17, 18), to move a friction element (2) of the brake, in use, into engagement with a rotary brake disc (4), and a thrust member (17A, 18A) arranged to transmit force from the actuator (13) to the force transmission device (17, 18), the actuator (13) being arranged to engage the thrust member (17A, 18A) in a manner such as to prevent rotation of the latter.

19 Claims, 4 Drawing Sheets

DISC BRAKE ACTUATOR

BACKGROUND OF THE INVENTION

This invention relates to an actuator device for a disc brake, primarily for a motor vehicle, the device including a rotary actuator operable, via a force transmission device, to move a friction element of the brake, in use, into engagement with a rotary brake disc. The invention also embraces a disc brake incorporating such an actuator device.

SUMMARY OF THE INVENTION

Our earlier specification WO97/01045 discloses an arrangement in which a thrust member, through which force is transmitted from the actuator to the force transmission device, is held against rotation by engagement with a plate extending between the thrust member and a further such member carried by an adjacent force transmission device associated with the actuator. This arrangement is satisfactory in very large brakes, but cannot easily be accommodated in smaller brakes in which there may be insufficient space in the region of the force transmission device for the convenient incorporation of the aforementioned anti-rotational arrangement.

According to the present invention, an actuator device for a disc brake comprises a rotary actuator operable, via a force transmission device, to move a friction element of the brake, in use, into engagement with a rotary brake disc, and a thrust member arranged to transmit force from the actuator to the force transmission device, the actuator being arranged to engage the thrust member in a manner such as to prevent rotation of the latter.

Conveniently, the thrust member is received within a recess of the actuator and a defining wall of the recess engages the thrust member to prevent rotation thereof.

Typically, the force transmission device includes a pair of threadedly interengaged elements forming part of an extensible adjuster strut, one of the elements being held against rotation by a non-circular formation carried by the thrust member, conveniently in the form of an elongate stem extending into a complementary bore of the element.

From another aspect of the invention, there is provided a disc brake incorporating the aforesaid actuator device.

The invention will now be described, by way of example, with reference to the accompanying drawings in which:

DETAILED DESCRIPTION OF THE PREFERRED EMBODIMENT

Figure 1:
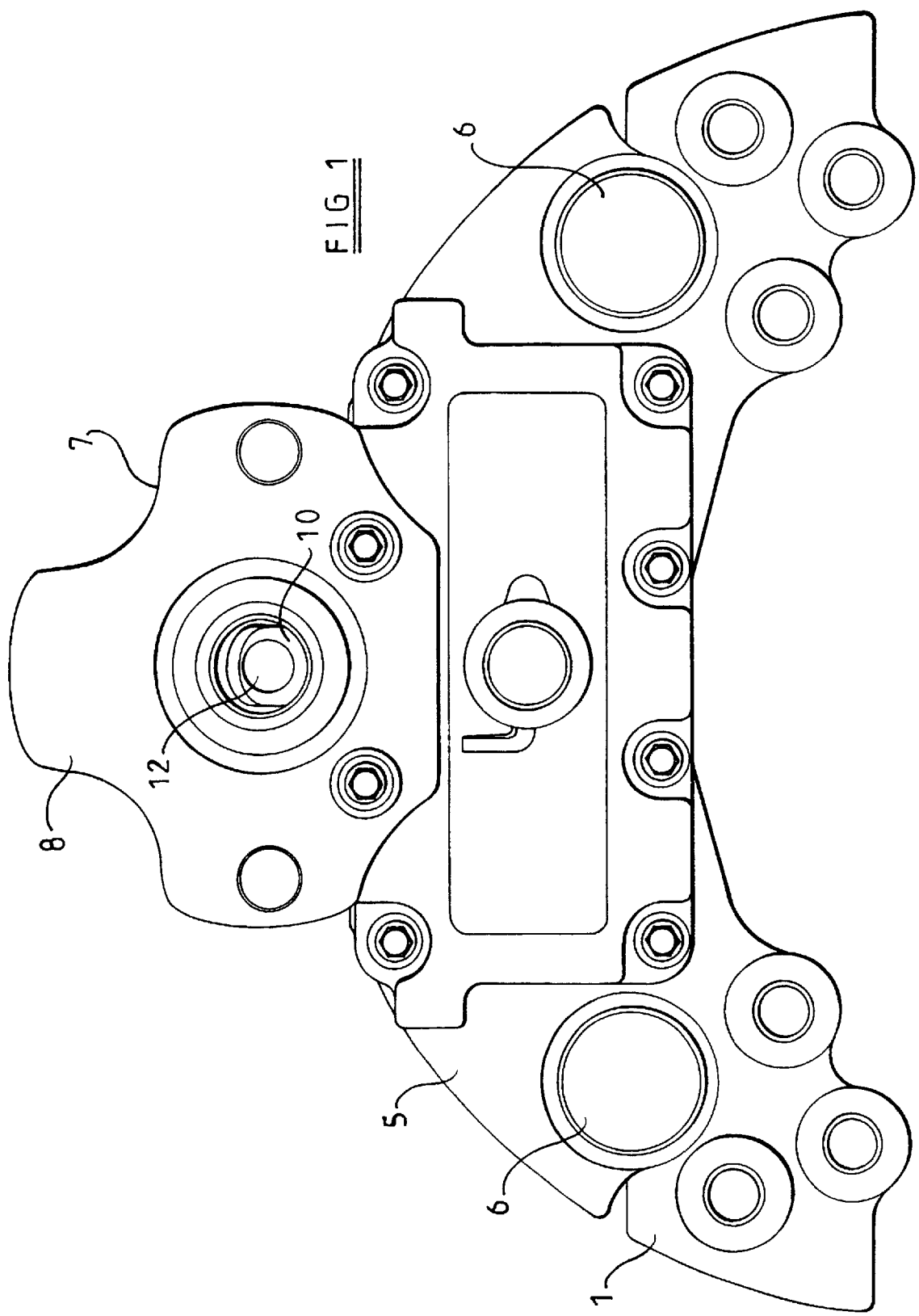
FIG. 1 is an end view of one form of the disc brake of the present invention.
Figure 2:
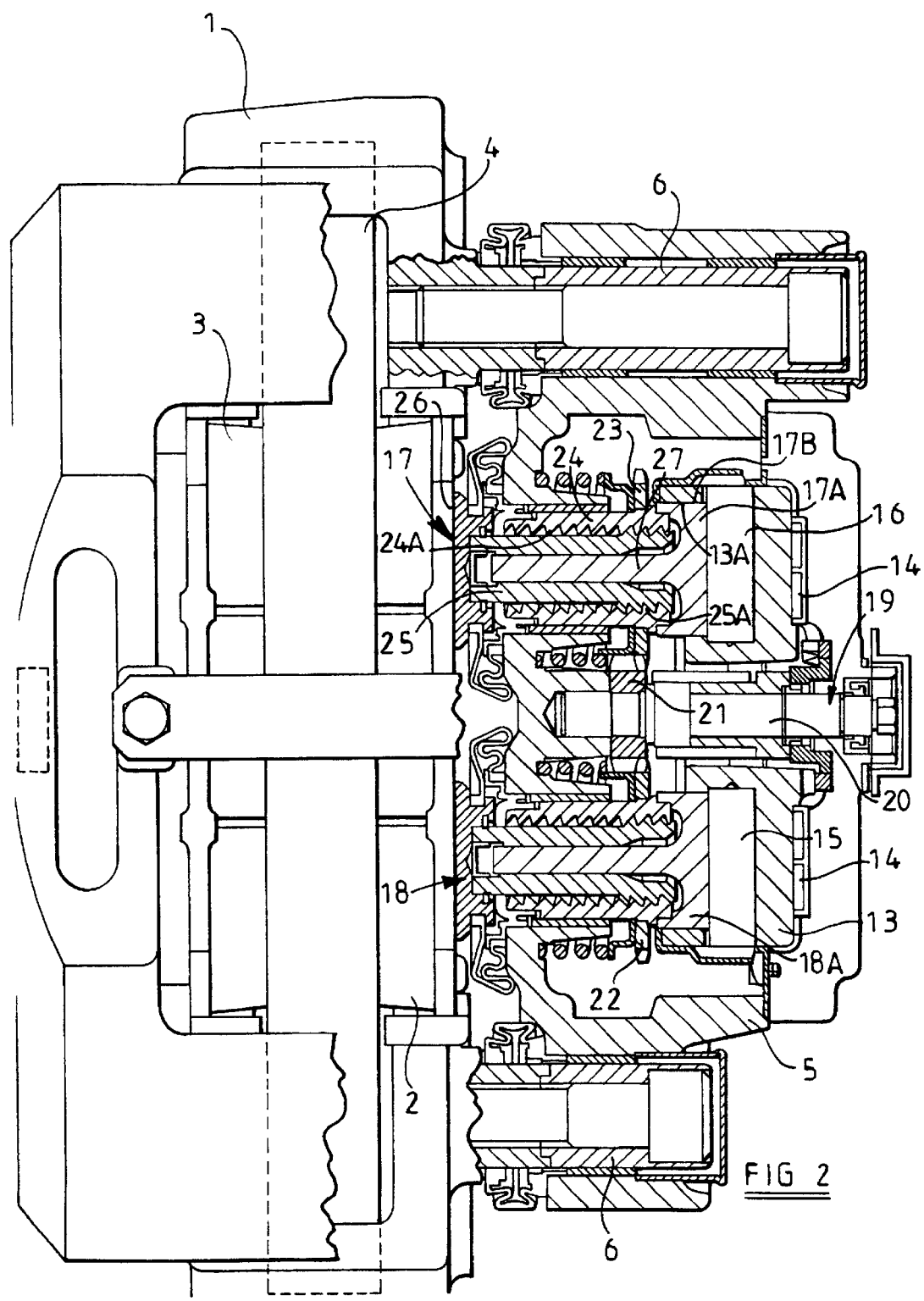
FIG. 2 is a view from above, partly in cross-section, of the brake of FIG. 1.

The disc brake illustrated in the drawings has a fixed carrier 1 which carries a pair of friction elements, shown as pads 2, 3, disposed respectively at either side of a brake disc 4, the carrier serving to mount the brake on a vehicle and to absorb torque sustained by the pads during a braking operation. A clamp member or calliper 5 straddles the brake disc and is mounted on the carrier so as to be slidable axially of the brake disc relative to the carrier, by way of pins 6, in conventional manner. The calliper carries an integral housing 7 which is adapted to mount a conventional air or other power actuator (not shown) on an external face 8 thereof. The housing 7 defines a chamber 9 within which a pivotal brake actuating lever 10 may perform an angular reciprocal swinging movement, as indicated by the arrows, under the action of a thrust member of the power actuator which, with the latter mounted on the face 8, extends through an opening 11 of the housing into engagement with a recess 12 of the lever 10. The lever is integral with or attached to a rotary actuating member 13 which is rotatably supported within the calliper by way of a pair of needle bearing assemblies 14. The member 13 is recessed to house respective cylindrical rollers 15, 16, the axes of which are offset from the rotary axis of the actuating member 13 and form an eccentric actuating arrangement with the rollers 15 and 16 bearing against respective thrust members 17A, 18A of adjacent thrust assemblies shown as adjustable tappet assemblies indicated generally at 17 and 18. Rotation of the lever 10 and its connected member 13 causes actuating thrust to be applied via the tappet assemblies to the directly actuated friction element 2 and, by reaction via the calliper 5, to the indirectly actuated friction element 3.

An adjuster assembly is indicated generally at 19 and may be of any appropriate conventional type needing no detailed description for the purpose of this invention. The adjuster responds to excessive movement of the friction elements 2, 3 and produces resultant rotation of an adjuster shaft 20 which, via an output gear 21 rotates a pair of input gears 22, 23 associated respectively with the adjustable tappet assemblies 17, 18.

Figure 4:
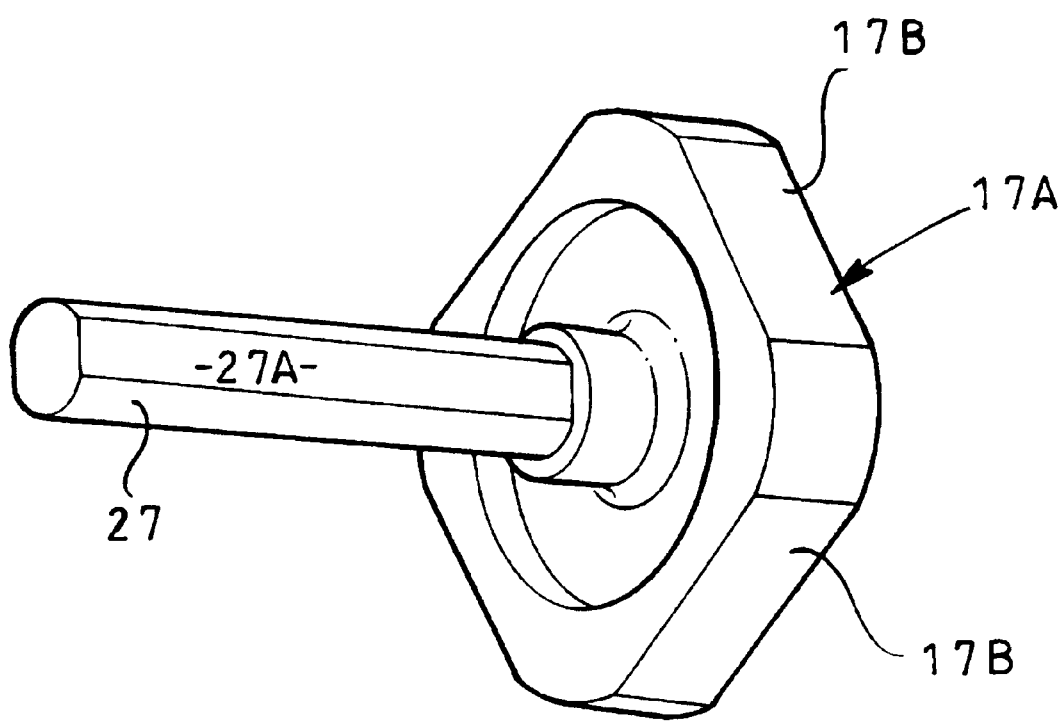
FIG. 4 is an enlarged view of a component of the brake of FIGS. 1 to 3.

The tappet assemblies are of identical construction and operation and only the assembly 17 will be described in sufficient detail for a full understanding of the invention. This assembly has an outer sleeve 24 which is internally threaded at 24A and receives a hollow internal shaft 25 having an externally threaded portion 25A extending over a part of its length for cooperation with the internal thread of the sleeve 24. The shaft and sleeve form between them an adjuster strut of variable length. The shaft 25 is provided, at its outer end, with a tappet head 26 which is releasably coupled to the shaft -o as, conveniently, to be freely rotatable relative to the latter. Operation of the adjuster 19 causes rotation of the outer sleeve 24 by way of the gear 21 and, in order to cause the inner shaft 25 to move axially so as to extend the adjuster strut to compensate for wear of the friction elements, it is necessary to lock this shaft against rotary movement. This is achieved, in the present embodiment, by providing the thrust member 17A, which is engaged over the adjacent end of the sleeve 24, with an elongate stem 27 of non-circular cross-section which extends within the hollow shaft 25, the internal surface of which forms a complementary bore. As best seen in FIG. 4, the stem 27 is provided with opposed flat surfaces 27A for engagement with corresponding surfaces within the shaft 25.

Figure 3:
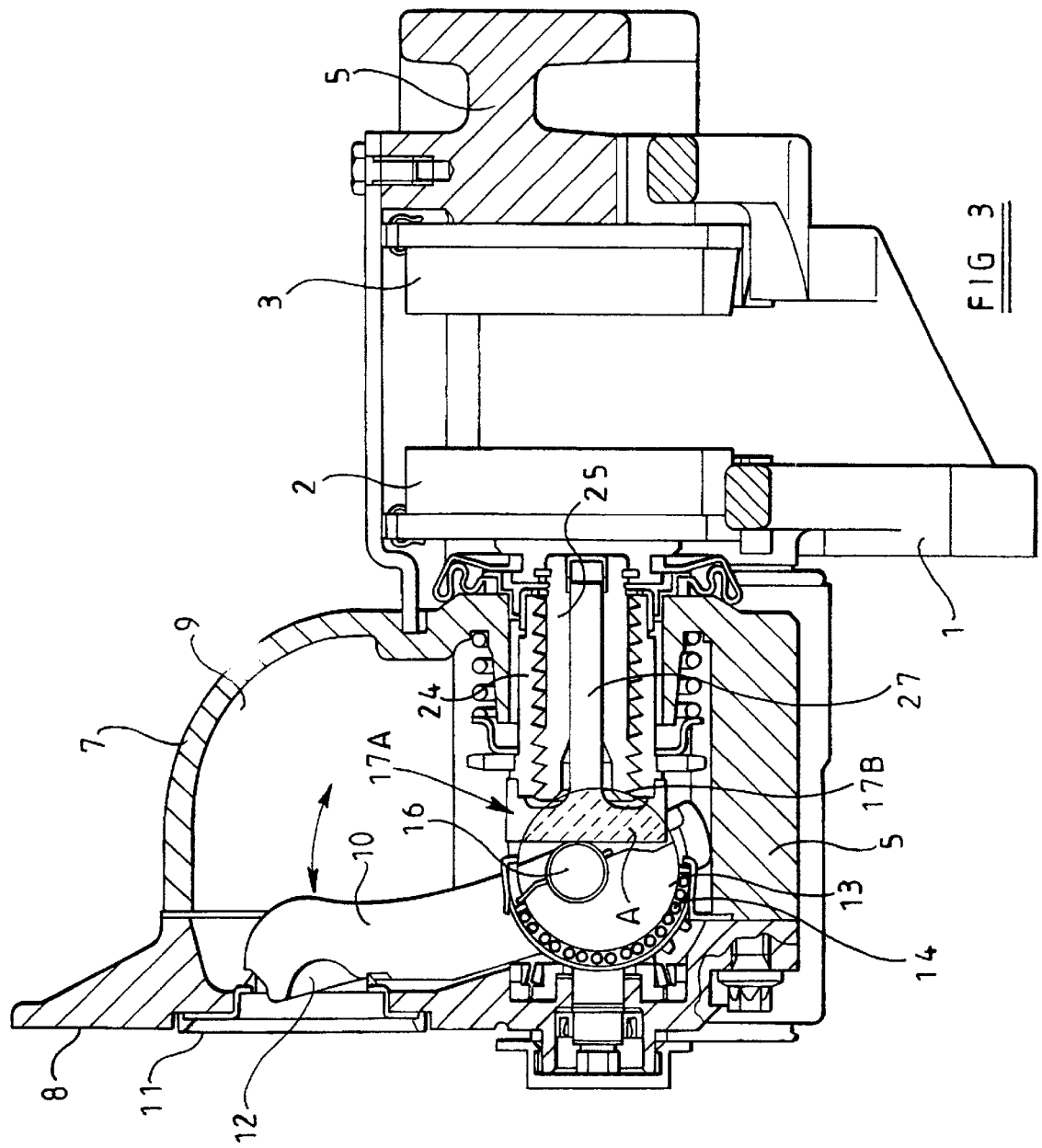
FIG. 3 is a side view, partly in cross-section, of the brake shown in FIGS. 1 and 2.

As can be seen more clearly from FIG. 4, the thrust member 17A is of generally rectangular form with four flat edge surfaces 17B. The thrust member is housed within a recess in the actuating member 13, which provides at least one planar surface 13A which engages the adjacent planar surface 17B of the thrust member so as to hold the thrust member against rotation. This in turn, via the stem 27, prevents rotation of the inner shaft 25, so that when the outer sleeve 24 is rotated by the adjuster 19, the inner shaft performs an axial adjusting movement in a direction such as to extend the strut and thereby compensate for wear of the adjacent friction element. As can be seen from FIG. 3, with the lever 10 in its illustrated rest position, a shaded area A, representing surface 13A of the actuating member, overlaps the surface 17B of the thrust member 17A to prevent rotation of the latter.

It will be seen that this arrangement for preventing rotation of the inner shaft 25 is accommodated within the normal dimensions of the actuating member 13 and is therefore compact and particularly suitable for use in a brake of relatively small dimensions.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An actuator device for a disc brake comprising:
   a rotary actuator operable, via a force transmission device, to move a friction element of the brake into engagement with a rotary brake, and
   a thrust member arranged to transmit force from the rotary actuator to the force transmission device, the rotary actuator being arranged to engage the thrust member to prevent rotation of the first member, wherein the thrust member is received within a recess of the rotary actuator and a defining wall of the recess engages the thrust member to prevent rotation thereof, and the device further includes a cylindrical roller acting between the rotary actuator and the thrust member, said cylindrical roller being received in said recess.

2. The device as claimed in claim 1, wherein the force transmission device includes a pair of extensible readedly interengaged elements, one of the elements being held against rotation by a non-circular formation carried by the rust member.

3. The device as claimed in claim 2, wherein the non-circular formation is an elongate stem extended into a complementary bore of said one element.

4. The device as claimed in claim 3, wherein one end of the thrust member carries a head from which extends the elongate stem, the head providing a surface for engagement by the rotary actuator to prevent rotation of the thrust member.

5. The device as claimed in claim 2, wherein said one element is a shaft having an external thread and the other element is a sleeve having an internal thread engaged with said external thread.

6. The actuator device as claimed in claim 1 wherein the thrust member engages the force transmission device.

7. The actuator device as claimed in claim 1 further including an adjuster assembly which responds to wear of the friction element by rotating one of a pair of extensible readedly interengaged elements of the force transmission device to compensate for wear of the friction element.

8. The actuator device as claimed in claim 1 wherein there arc a pair of the force transmission devices and a pair of the thrust members.

9. The actuator device as claimed in claim 1, wherein said thrust member being generally cylindrical in defining a central axis, and rotation about said central axis being prevented by said rotary actuator.

10. The actuator device as claimed in claim 1, wherein there is a thrust path between said rotary actuator and said thrust member, and the structure for preventing rotation of said thrust member being within said thrust path.

11. The device as claimed in claim 1 wherein said wall includes a hole for insertion of said cylindrical roller in said recess.

12. A disc brake comprising:
   a friction element;
   a rotary brake; and
   an actuator device including a rotary actuator operable, via a pair of force transmission devices, to move the friction element of the brake into engagement with the rotary brake and a pair of thrust members arranged to transmit force from the rotary actuator to the force transmission device, the rotary actuator being arranged to engage the thrust members to prevent rotation of the thrust members, wherein the device further includes a cylindrical roller acting between the rotary actuator and the thrust member, said cylindrical roller being received in a recess of said rotary actuator.

13. The disk brake as recited in claim 12, wherein said thrust member being generally cylindrical in defining a central axis, and rotation about said central axis being prevented by said rotary actuator.

14. The disk brake as recited in claim 12, wherein there is a thrust path between said rotary actuator and said thrust member, and the structure for preventing rotation of said thrust member being within said thrust path.

15. The disk brake as recited in claim 12, wherein the force transmission device includes a pair of extensible threadedly interengaged elements, one of the elements being held against rotation by a non-circular formation carried by the thrust member.

16. The disk brake as recited in claim 15, wherein the non-circular formation is an elongate stem extended into a complementary bore of said one element.

17. The disk brake as recited in claim 16, wherein one end of the thrust member carries a head from which extends the elongate stem, the head providing a surface for engagement by the rotary actuator to prevent rotation of the thrust member.

18. The disk brake as recited in claim 15, wherein said one element is a shaft having an external thread and the other element is a sleeve having an internal thread engaged with said external thread.

19. The disc brake as claimed in claim 12 wherein a wall includes a hole for insertion of said cylindrical roller in said recess.

* * * * *

UNITED STATES PATENT AND TRADEMARK OFFICE
CERTIFICATE OF CORRECTION

PATENT NO.     : 6,435,319 B1
DATED          : August 20, 2002
INVENTOR(S)    : Thomas et al.

It is certified that error appears in the above-identified patent and that said Letters Patent is hereby corrected as shown below:

Column 3,
Line 32, "first" should be -- thrust --
Line 40, "readedly" should be -- threadedly --
Line 43, "rust" should be -- thrust --

Column 4,
Line 1, "readedly" should be -- threadedly --
Line 4, "arc" should be -- are --

Signed and Sealed this

Third Day of December, 2002

JAMES E. ROGAN
*Director of the United States Patent and Trademark Office*